United States Patent
Kuchler

(10) Patent No.: US 7,177,739 B2
(45) Date of Patent: Feb. 13, 2007

(54) METHOD AND DEVICE FOR MONITORING A PHYSICAL VARIABLE ON A WHEEL OF A VEHICLE

(75) Inventor: Gregor Kuchler, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 11/057,629

(22) Filed: Feb. 14, 2005

(65) Prior Publication Data

US 2005/0178193 A1    Aug. 18, 2005

(30) Foreign Application Priority Data

Feb. 12, 2004   (DE)   ...................... 10 2004 006 977

(51) Int. Cl.
*B60C 23/00*   (2006.01)
*G08C 17/02*   (2006.01)

(52) U.S. Cl. ........................... 701/29; 701/32; 701/35; 340/447

(58) Field of Classification Search ..................... None
See application file for complete search history.

(56) References Cited

U.S. PATENT DOCUMENTS

| | | | |
|---|---|---|---|
| 6,489,888 B1 * | 12/2002 | Honeck et al. | 340/442 |
| 6,571,617 B2 * | 6/2003 | Van Niekerk et al. | 73/146 |
| 6,633,229 B1 * | 10/2003 | Normann et al. | 340/447 |
| 6,693,522 B2 * | 2/2004 | Tang et al. | 340/445 |
| 6,788,193 B2 * | 9/2004 | King et al. | 340/447 |
| 2003/0001735 A1 | 1/2003 | Honeck et al. | |
| 2003/0043031 A1 | 3/2003 | Nowottnick et al. | |
| 2003/0076222 A1 * | 4/2003 | Fischer et al. | 340/442 |
| 2003/0197603 A1 * | 10/2003 | Stewart et al. | 340/442 |
| 2004/0021562 A1 | 2/2004 | Prenninger | |

FOREIGN PATENT DOCUMENTS

DE   101 40 146 A1   2/2003
DE   102 23 214 A1   12/2003

\* cited by examiner

*Primary Examiner*—Michael J. Zanelli
(74) *Attorney, Agent, or Firm*—Laurence A. Greenberg; Werner H. Stemer; Ralph E. Locher

(57) ABSTRACT

A method for monitoring a physical variable, in particular the tire pressure, of a wheel fitted on a vehicle is performed when the vehicle travels. The physical variable is measured at the wheel and transmitted to a receiver on the vehicle. An evaluation/storage unit determines and stores a predefined first comparative intensity distribution of the receiving strength of the radio signals at a specified deflection angle between the longitudinal axis of the vehicle and the plane of the wheel and a random sample for the actual intensity distribution of the receiving strength of the radio signals being recorded by the repeated transmission and receiving of a plurality of radio messages.

24 Claims, 3 Drawing Sheets

METHOD AND DEVICE FOR MONITORING A PHYSICAL VARIABLE ON A WHEEL OF A VEHICLE

BACKGROUND OF THE INVENTION

FIELD OF THE INVENTION

The invention relates to a method and a device for monitoring a physical variable, in particular the tire pressure, of a wheel fitted on a vehicle during travel. The physical variable is measured at the wheel and a radio message is transmitted containing information about the measured physical variable. The radio message is received and processed on the vehicle.

Monitoring specific physical variables of the wheels of a vehicle using a sensor mounted on the wheel with a transmitter connected thereto is an established method. The sensor thereby determines the monitored variable, for example the tire pressure, and transmits the data obtained to a receiver attached to the vehicle. The receiver is connected to the electronic control system of the vehicle, which evaluates the data received.

If this is tire pressure data, as in the example given, the vehicle electronics system is able to provide the driver with information about the tire pressure and to prompt the driver to carry out maintenance in the event that the tire pressure is too low or to give an alarm in the event of a danger situation ("bursting tire").

It is expedient to assign this information to a wheel in a specific position, such as "front right" or "rear left". This enhances the useful nature of the information—the driver can respond appropriately to a hazardous situation and the relevant wheel can be established immediately for any necessary maintenance work.

It is an easy matter to add the identification code of the transmitter and therefore also the wheel to the transmitted data. However it is not yet possible to ascertain from this in which position the wheel is fitted. Even if the electronic control system knows the assignment of identification code to wheel position, the manual determination of which involves additional outlay, this assignment can vary after a wheel rotation or change for example and is therefore unreliable.

This is why methods have already been developed to determine the position of a wheel within a vehicle solely from the transmitted data. A whole series of approaches are used to this end. Corresponding methods and devices for this purpose have been disclosed in the published, non-prosecuted German patent application DE 102 23 214 A1 (corresponding to U.S. patent publication No. 2004/0021562 A1) and published, non-prosecuted German patent application DE 101 40 146 A1 (corresponding to U.S. patent publication No. 2003/0043031 A1) and U.S. patent publication No. 2003/0001735 A1. The first-mentioned publication for example sets out a method for monitoring the tire pressure of a wheel fitted on a vehicle during travel. With this method the physical variable is measured at the wheel and transmitted in the manner of a radio message containing information about the measured physical variable to a control unit, where it is received and processed. A first comparative intensity distribution of the receiving strength of the radio signals is thereby determined beforehand and stored and a random sample of the actual intensity distribution of the receiving strength of the radio signals is recorded during operation by repeated transmission and receiving of a plurality of radio messages. A statistical test is then used to determine whether the random sample could have been taken from the first comparative intensity distribution and the test result is used to decide in which position the wheel is fitted. Partial position determination has already been attempted in at least three ways. It is therefore possible to use the different accelerations, to which the inner and outer wheels are subject on a curve, to determine a right-left position. However in addition to acceleration detectors, this requires independent information about whether the vehicle is in a right or left curve.

The different tire pressures of the front and rear wheels can also be used for a partial position determination (front/rear). However this method is circular, even if the monitored variable is the tire pressure, circular, and in any case not particularly reliable.

A third option is to dispose the receiving antenna in a non-central position in the vehicle, so that two of the wheels—the left or right ones—are significantly further from the antenna than the two others. It is then possible to use the receiving strength of the signal transmitted by the wheel (the so-called RSSI or received signal strength indicator) to determine the distance between the wheel and the receiving antenna and from this, because of the asymmetrical configuration of the receiving antenna, which of the two wheel pairs mentioned above the signal is assigned to, as known from published, non-prosecuted German patent application DE 102 23 214 A1 (corresponding to U.S. patent publication No. 2004/0021562 A1).

With the last-mentioned method however it is necessary to take into account that due to the rotation of the wheels the RSSI is not constant but subject to statistical variation, depending on the state of rotation when the signal is transmitted. It is thus only possible to determine the RSSI with certain tolerance intervals. The position of the receiving antenna is selected such that the two tolerance intervals of the two wheel pairs do not intersect. It is therefore possible to distinguish reliably whether the rear or front wheel pair has transmitted. A generalization to allow a full position determination of all four wheels by disposing the antenna asymmetrically in respect of the longitudinal axis of the vehicle as well is not possible, because intersection of the now four tolerance intervals cannot then be avoided.

A full position determination was only proposed using additional expensive hardware, for example with a plurality of receiving antennae.

All the methods mentioned thus require either additional hardware to allow unique position determination or can only provide partial position information in a manner that cannot be extended to allow full position information.

SUMMARY OF THE INVENTION

It is accordingly an object of the invention to provide a method and a device for monitoring a physical variable on a wheel of a vehicle which overcome the above-mentioned disadvantages of the prior art methods and devices of this general type. The object of the invention is therefore to allow unique position determination for wheels in a traveling vehicle with the least possible additional outlay. It should be possible in particular to be able to extend the position determination to a full position determination without additional hardware outlay.

With the foregoing and other objects in view there is provided, in accordance with the invention, a method for monitoring a physical variable of a wheel fitted on a vehicle during travel. The method includes measuring the physical variable at the wheel, transmitting a radio message containing information about the physical variable, receiving and processing the radio message on the vehicle, and determining and storing a first comparative intensity distribution of a receiving strength of radio signals at predefined deflection angles between a longitudinal axis of the vehicle and a plane of the wheel. A random sample of an actual intensity distribution of the receiving strength of further radio signals are recorded during operation by repeated transmission and receiving of a plurality of the further radio messages. A statistical test is used to determine whether the random sample could have been taken from the first comparative intensity distribution and a test result is used to decide whether or not the wheel has achieved a predefined deflection angle. A conclusion is made from the predefined deflection angle determined by the statistical test, on whether the wheel is a steered wheel or an unsteered wheel.

The solution is based on the principle of position determination based solely on software. This makes use of the fact that signals emitted by the rotating wheels are not received with a constant strength but are subject to statistical distribution. As the statistical distribution depends among other things on the steering position of the wheels, it can be used to determine whether the signal was transmitted by a steered or an unsteered wheel.

The solution according to the invention has a plurality of advantages. First a purely software solution saves on cost for the same high level of reliability by dispensing with additional hardware that may be subject to failure. By making a distinction based on steering status, it is possible to combine a method already known according to the prior art with partial position determination without mutual interference. A full position determination is then thus achieved without the invention requiring additional hardware.

Advantageously moments, in particular the standard deviation, of the random sample are calculated for the statistical test and compared with the corresponding moments of the first comparative intensity distribution. The standard deviation is a reliable measure that is simple to determine, which thus allows a decision to be made quickly and with a relatively high level of certainty whether or not the random sample could have been taken from a comparative distribution.

At least a second comparative intensity distribution is preferably recorded beforehand at a deflection angle, which is different from the deflection angle for the first comparative intensity distribution. The use of a plurality of comparative intensity distributions is an appropriate method of enhancing the reliability and accuracy of the method.

The deflection angle for one of the comparative intensity distributions is expediently the zero position, at which the plane of the wheel and the longitudinal axis of the vehicle are parallel to each other. The zero position is particularly characteristic, as unsteered wheels always remain in it and this comparative intensity distribution is therefore particularly incisive.

It is advantageous if the actual deflection angles of the steered wheels of the vehicle are also determined independently and stored for every data point of the random sample, the actual deflection angle is used to create sub-groups of the random sample with the same or similar deflection angles and these sub-groups are tested respectively against the comparative intensity distribution, which was defined for the deflection angle that corresponds as closely as possible to the actual deflection angle.

As the comparative distribution function is actually functionally dependent on the deflection angle, the accuracy of the evaluation is enhanced, if this deflection angle is also determined and taken into account.

Sub-groups are preferably thereby rejected, if the actual deflection angle differs beyond a defined degree from the deflection angle, for which the comparative intensity distribution was defined. Such sub-groups can corrupt the evaluation, because it is evident beforehand that they are not taken from the comparative intensity distribution.

If—in an advantageous embodiment of the method—the acceleration, speed and/or tire profile depth are also measured at the wheel and transmitted, additional parameters are monitored for the user and the electronic control system, which give the user a better overview and allow the electronic control system to carry out further safety checks.

In a vehicle, in which each wheel transmits a radio message containing identification information that is characteristic of the wheel and in which the wheels can be classified as steered and unsteered wheels and also as wheels disposed on the right and left in relation to the longitudinal axis of the vehicle, the wheels are advantageously categorized in four positions with reference to the radio messages. This is performed by deciding by a statistical test of the random sample against the comparative intensity distribution as described above whether the wheel is a steered wheel or an unsteered wheel. The radio messages are received at a location not on the longitudinal axis of the vehicle. A comparison of the received radio signal strengths is performed to determine distance from the receiving location. Thereby it can be decided whether the wheel is disposed on the right or left of the longitudinal axis of the vehicle.

A calibration phase is preferably provided, during which the positions of the wheels are defined, with the identification information for each wheel being assigned to the determined associated position after completion of the calibration phase and this assignment being stored in particular even permanently. Once the method according to the invention has determined the positions of the wheels, the positions determined previously can be accessed additionally or alternatively thereto. This enhances accuracy; it is at least possible to avoid unnecessary computation outlay.

A start-up phase is also preferably provided, the start-up phase ending when a minimum travel time has elapsed or a minimum number of deflection angles has been achieved and with the position information being classified as inaccurate or impossible to determine within the start-up phase. If the steered wheels have not been deflected during travel, position cannot be defined reliably. The start-up phase ensures that this does not result in error.

It is even more preferable for the start-up phase and/or its end to be displayed for the user. It is always then clear to the user whether the position determination is valid or when it will be available.

In the system according to the invention the computation unit advantageously has an integrator to determine statistical moments and the comparison device is configured to decide whether or not a given value is within a tolerance interval. The moments can therefore be calculated quickly and without outlay.

The system preferably has a deflection detector mounted in the wheel, on the wheel case or on the steering system and connected to the computation unit. The deflection detector supplies independent data about the deflection angle, which can be used for a better statistical evaluation.

The system also preferably has an acceleration sensor, a speed sensor and/or a tire profile sensor, which can measure acceleration, speed or tire profile depth and is/are connected to the transmitter to transmit the data in the radio message.

This configuration provides fast access to further important physical variables, which contribute to safety and ease of maintenance.

Each tire of the vehicle advantageously has a transmitter and an identification storage device for permanent storage of identification information characteristic of the wheel and a receiving antenna of the receiver is not attached on the longitudinal axis of the vehicle. The evaluation/storage unit of the receiver uses the identification information to assign received radio messages to each transmitter and carry out a right/left assignment for the transmitter associated with the radio message based on the intensity of the radio message received. With this configuration it is possible to carry out a full position determination for the wheels without additional hardware.

The computation unit preferably has a position storage device, which can store the assignment of identification information to positions of the wheels particularly also in a permanent manner. The storage device can be used to retrieve previous position data at any time, allowing comparison or particularly fast access without evaluation.

A clock, which measures the duration and expiry of a start-up phase, or a counter for different deflection angles, is preferably provided, to count the duration and expiry of a start-up phase using the minimum number and minimum duration of deflection angles occurring, with a signal being emitted to the connected evaluation/storage unit after expiry of the start-up phase. A display connected to the evaluation/storage unit is thereby preferably provided, which can display the duration or expiry of the start-up phase. The user thereby also knows whether the displayed position data is valid or when valid data can be expected.

Other features which are considered as characteristic for the invention are set forth in the appended claims.

Although the invention is illustrated and described herein as embodied in a method and a device for monitoring a physical variable on a wheel of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
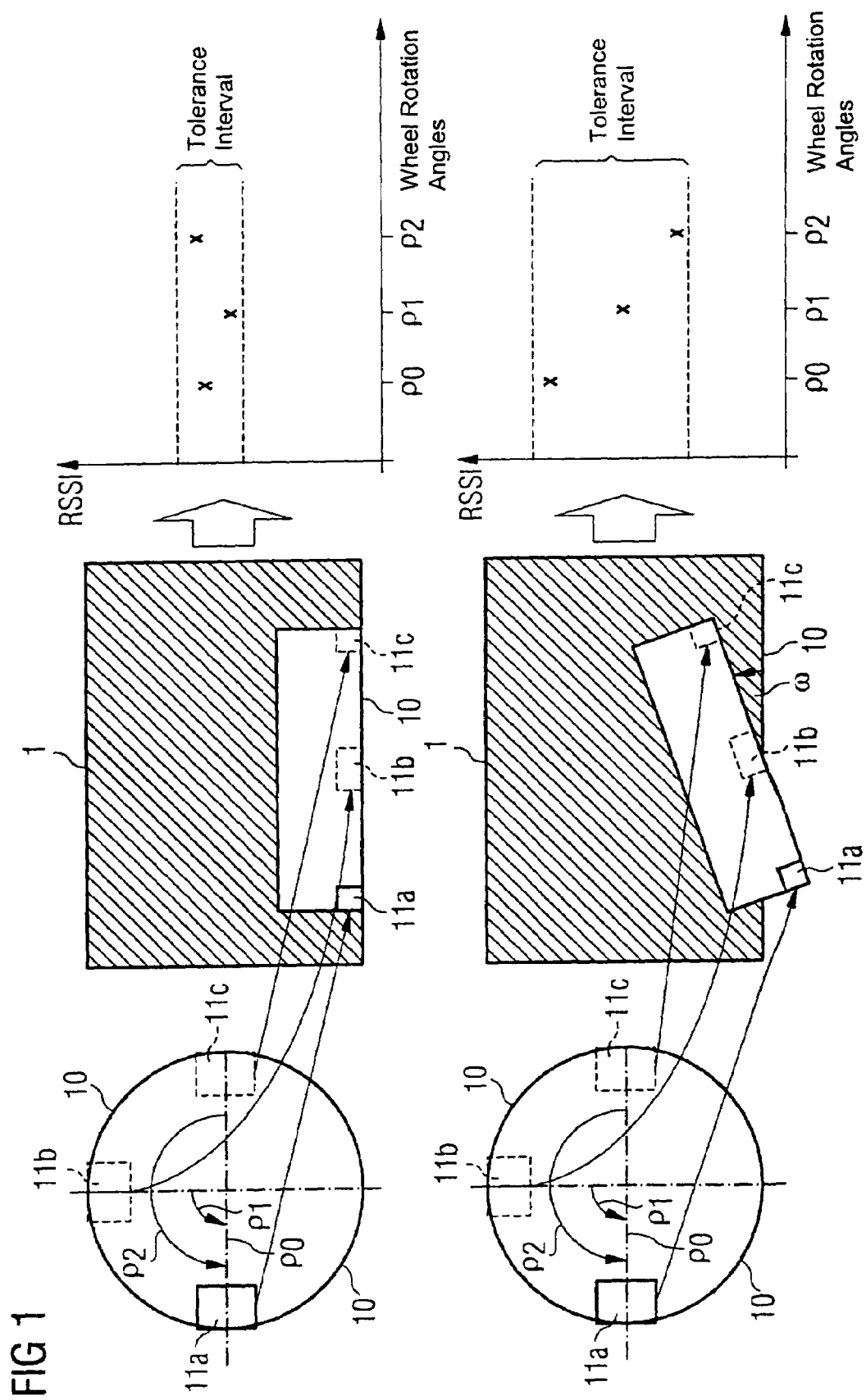
FIG. 1 is a diagram showing the relationship between a steering position of a wheel and an intensity distribution of a receiving strength of a signal transmitted by the wheel according to the invention.

Referring now to the figures of the drawing in detail and first, particularly, to FIG. 1 thereof, there is shown a method according to the invention for distinguishing between steered and unsteered wheels 10 in a vehicle 1. If the vehicle 1 is an automobile of conventional design, the two steered wheels 10 are the front wheels and the two unsteered wheels 10 are the rear wheels. The invention is not however restricted in any way to automobiles but can also advantageously be applied to other wheeled vehicles.

The upper half of FIG. 1 shows the wheel 10 fitted on a vehicle 1 in an unsteered, parallel orientation in respect of the longitudinal axis of the vehicle, while the lower half of FIG. 1 shows the wheel 10 in a steered orientation, the wheel forming a deflection angle $\omega$ with the longitudinal axis of the vehicle. The left column of FIG. 1 is a side view of the wheel 10. A wheel unit 11 is mounted on the wheel, which can measure and transmit a physical variable. The wheel unit 11 is described in more detail below in relation to FIG. 3A.

When the vehicle 1 is traveling, the wheel 10 rotates and the wheel unit 11 changes position. It thereby assumes different rotation angle positions $\rho$, of which a zero position 11$a$ is shown at a rotation angle $\rho_0$ and two of the possible further positions 11$b$, 11$c$ are shown at rotation angles $\rho_1$ and $\rho_2$.

The center column of FIG. 1 shows a top view of the wheel 10. It also shows some of the positions 11$a$, 11$b$, 11$c$ of the wheel unit 11 during rotation of the wheel 10. The wheel 10 at the top is not deflected but is parallel to the longitudinal axis of the vehicle 1. In contrast the wheel 10 at the bottom is deflected by a deflection angle $\omega$ compared with the longitudinal axis of the vehicle 1.

The right column of FIG. 1 shows an example of the strength of the received signals or RSSI at different rotation angles $\rho$, at the top for the undeflected wheel and at the bottom for the wheel deflected by a deflection angle $\omega$.

The RSSI of the undeflected wheel 10 is within a relatively narrow tolerance interval. The fluctuations in RSSI are substantially due to the fact that signals from the wheel unit 11 are screened in a differing manner by the wheel itself at different positions 11$a$, 11$b$, 11$c$. In the case of the deflected wheel 10, the tolerance interval of the RSSI is significantly wider, as in addition to screening by the wheel 10 itself, parts of the vehicle 1, e.g. the wheel case, also screen the transmitted signal to differing degrees depending on the position 11$a$, 11$b$, 11$c$ of the wheel unit 11.

The distribution functions of the RSSI of a deflected and an undeflected wheel 10 thus differ in a manner that can be identified by statistical methods. A corresponding statistical evaluation method is examined in more detail below with reference to FIG. 3B.

Figure 2:
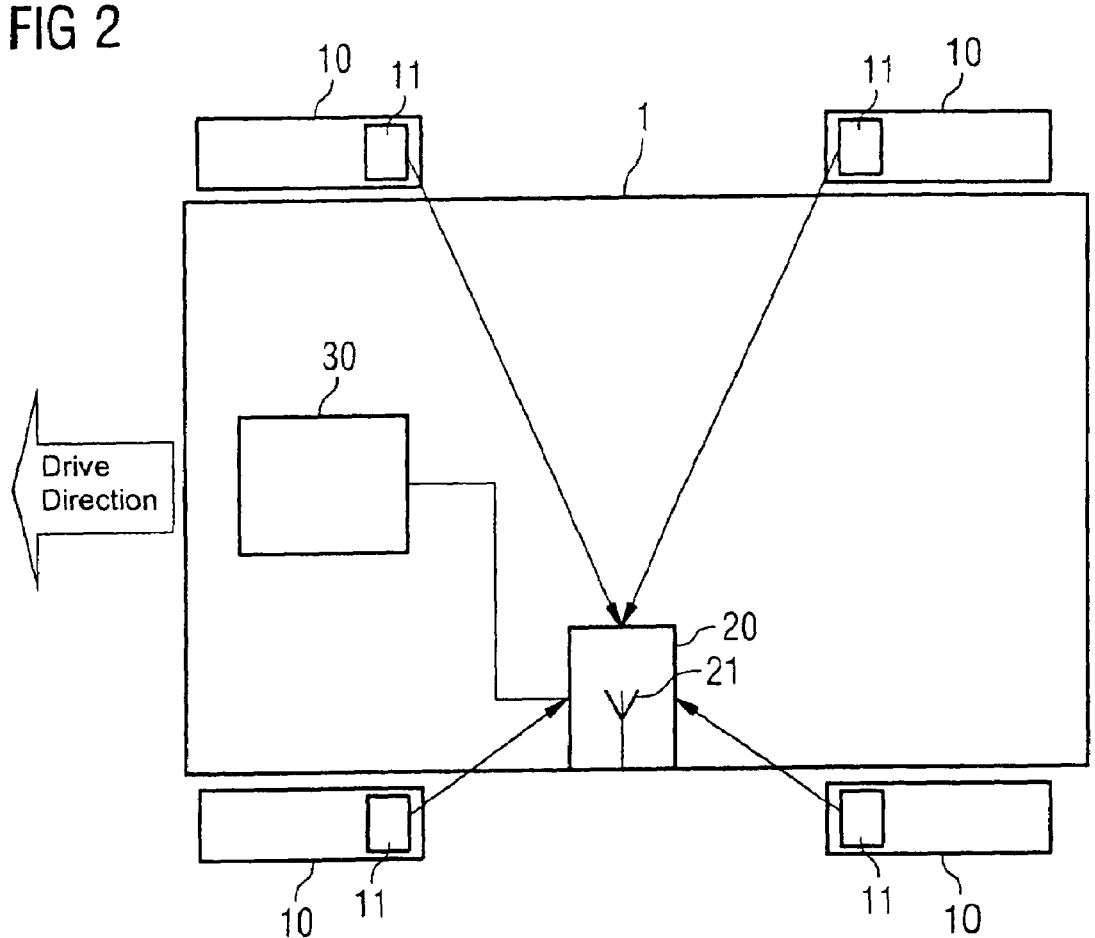
FIG. 2 is a schematic drawing of a vehicle, in which the right/left position of the wheels can be determined using a receiving antenna disposed asymmetrically in respect of the longitudinal axis of the vehicle.

FIG. 2 shows a schematic top view of the vehicle 1 to clarify the preferred right/left position determination of the wheels 10 in relation to the longitudinal axis. A receiver 20 mounted on the vehicle receives signals from the wheel units 11 via a receiving antenna 21, which is disposed asymmetrically in relation to the longitudinal axis of the vehicle 1. In the example shown the receiving antenna 21 is attached on the far left of the vehicle 1 in the direction of travel.

An evaluation/storage unit 30 is connected to the receiver 20 and the signals and associated RSSI values are transmitted from the receiver 20 to the evaluation/storage unit 30. In addition to the information about the physical variable monitored by the wheel unit 11, each signal also contains information identifying the transmitter. The evaluation/storage unit thus receives transmitter-specific RSSI values. The RSSI values provide information about the distance of the transmission sources, as they decrease with distance due to greater screening losses and the distance-dependent energy losses of each electromagnetic signal. Higher RSSI values are therefore assigned to the nearer wheels, in the example shown therefore those on the left in the direction of travel, while lower RSSI values are assigned to the right wheels. Right/left position determination is thus achieved in this manner.

The method according to the invention for distinguishing between steered and unsteered wheels in a device according to the invention is now described in detail with reference to FIGS. 3A and 3B.

Figure 3A:
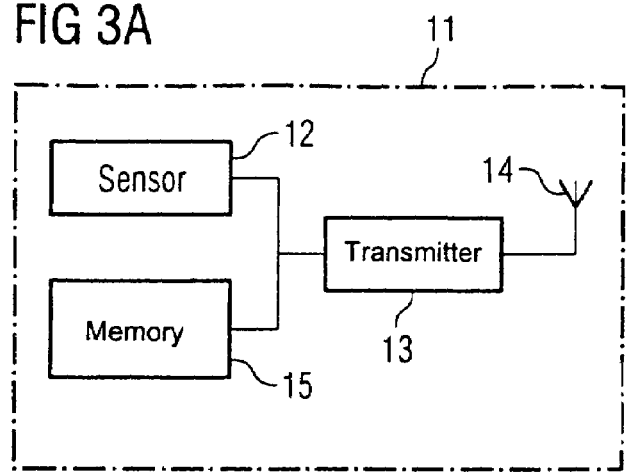
FIG. 3A is a block diagram of a monitoring unit with a transmitter for transmitting monitoring signals, which is mounted on a wheel.

FIG. 3A shows the wheel unit 11, having a sensor 12 to determine a physical variable, such as the tire pressure, acceleration, speed or profile depth. The sensor 12 is connected to a transmitter 13, which transmits a physical variable measured by the sensor 12 as well as a code identifying the transmitter via a transmission antenna 14 in the form of a radio message, which is stored in an ID memory device 15.

The wheel unit 11 can transmit the radio message continuously or according to predefined criteria. Such criteria could be periodic transmission or transmission after every steering movement or at defined rotational positions of the wheel 10 or any other appropriate criterion. It is also possible to equip the wheel unit 11 with a receiver, so that it can transmit on request. One advantage of not transmitting continuously is that it conserves energy and avoids unnecessary radio traffic.

The sensor 12 can be a tire pressure sensor. It can however, additionally or alternatively, measure further physical variables, such as acceleration, speed or tire profile depth. Such information increases the overview the user has of the vehicle and can enhance drive comfort and safety.

Figure 3B:
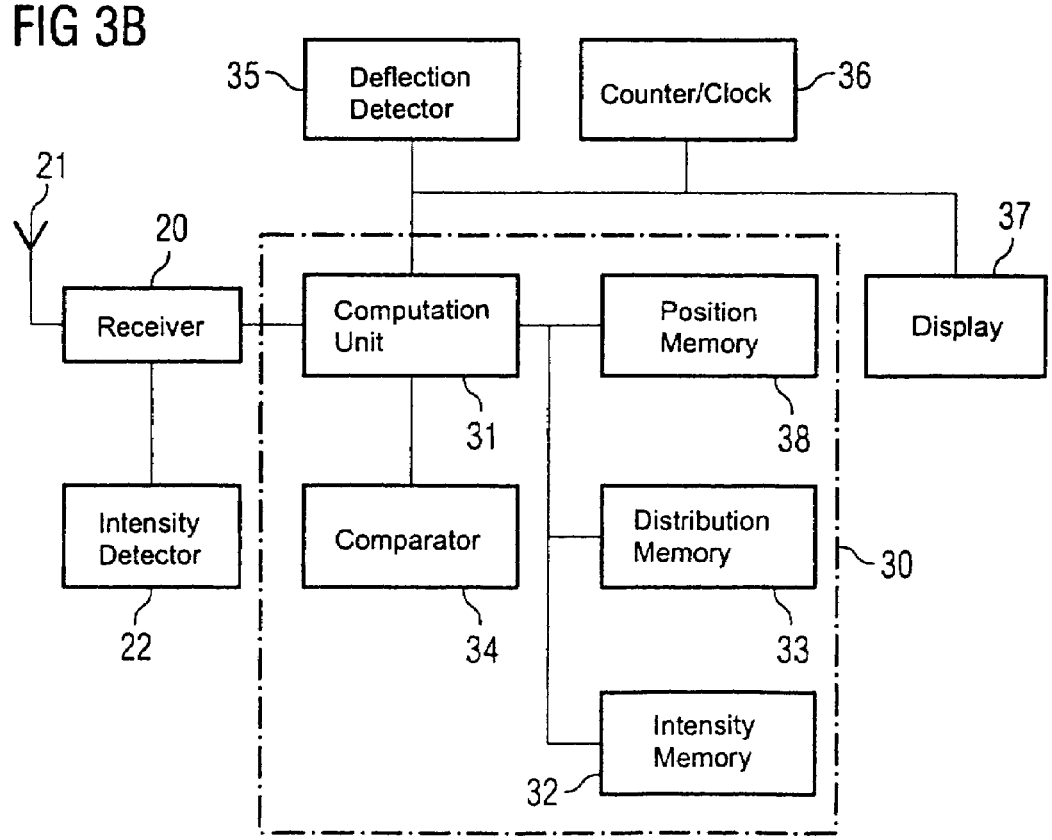
FIG. 3B is a block diagram of a receiving and evaluation unit for received monitoring signals.

FIG. 3B shows the receiver 20 and the evaluation/storage unit 30. The radio message transmitted by the wheel unit 11 is received by the receiver 20 by the receiving antenna 21. An intensity detector 22 linked to the receiver 20 determines the strength of the received signal, for example directly as energy or as RSSI.

The radio message and RSSI are then transmitted to the evaluation/storage unit 30. It should be pointed out here that the individual components of the receiving unit and evaluation/storage unit 30 and the connections between these should only be seen as examples. A receiver and intensity detector would suffice as the minimum hardware deployment, the intensity detector 22 being linked to the computer of the electronic control unit (ECU) present in every modern vehicle.

In the device shown the receiver 20 transmits the radio message and RSSI to a computation unit 31 of the evaluation/storage unit 30. The RSSI is then stored by the computation unit 31 in a linked intensity memory 32 as the first transmitter-specific data point. The identification code transmitted in the radio message is used for assignment to a transmitter. Only one transmitter is referred to hereafter, as the method is exactly the same for the other transmitters.

The transmission and receiving process described is repeated a number of times before the first evaluation. A random sample for the RSSI distribution function is defined in this manner, the statistical significance of which increases with every further RSSI data point.

Expected RSSI distributions have already been stored before operation in a distribution memory 33, which is connected to the computation unit 31. An expected RSSI distribution is thereby assigned to different deflection angles $\omega$ of the wheel 10 respectively. More specifically the continuous values of the deflection angle $\omega$ mean that the RSSI distribution is also a function of $\omega$, which is approximated discretely by a plurality of RSSI distributions for a respectively fixed $\omega$.

The stored expected RSSI distributions can be determined on the basis of theoretical considerations. However they can be estimated, additionally or alternatively, by taking a random sample at a specified deflection angle $\omega$ in the same way as with the method during operation and storing the random sample in the distribution memory 33 as a discrete estimation of the actual distribution before operation.

A comparison device 34, which is connected to the computation unit 31, now compares the expected RSSI distribution stored in the distribution memory 33 and the random sample of RSSI data points taken during operation. Different implementation options now exist. According to one, if the random sample is incompatible with the RSSI distribution for $\omega=0$, i.e. an unsteered wheel, it is ascertained that the wheel is a steered wheel. Alternatively the hypothesis can be tested that the wheel is a steered wheel and a plurality of RSSI distributions can be used at the same time for different $\omega$. Ultimately this implementation selection depends on which errors of the $1^{st}$ or $2^{nd}$ type are deemed to be more serious for the functionality of the monitoring system. Statistical conversion is then a standard method, which can be found in the standard mathematical literature.

One very simple test is to estimate the moments of distribution from the random sample and compare them with criteria derived from the moments of distribution. The $2^{nd}$ moment, the standard deviation, is particularly suitable for this. If it exceeds a threshold value, the wheel 10 is classed as steered, since, as shown in FIG. 1, the tolerance interval of a deflected wheel 10 is larger than that of an undeflected wheel 10.

The accuracy of the method is further enhanced if the system has a deflection detector 35, which determines the actual deflection of the wheel 10 and transmits it to the connected computation unit 31. Such a detector 35 can be mounted on the steering wheel, the wheel or the wheel case and determines the deflection angle $\omega$ independently. The actual deflection angle $\omega$ is stored with the RSSI data point, so that the statistical evaluation includes information about the expected intensity distribution from which the RSSI data point was taken. It is thus possible to create sub-groups of the RSSI data point random sample and test them in each instance just against the associated RSSI distribution of the same or similar deflection angle $\omega$ and it is also possible to reject sub-groups, if no RSSI distribution is stored, the associated deflection angle $\omega$ of which matches the subgroup.

In the comparison the evaluation/storage unit 30 generally determines whether the radio message originates from a deflected or an undeflected wheel 10. With an automobile of conventional design it can be assumed that a deflected wheel is a front wheel and an undeflected wheel is a rear wheel.

But this is not necessarily the case. On the one hand the rear wheels may also be steered. A method tailored to such automobiles would require a time-dependent statistical test to identify the rear wheels using the disclosed method based on the fact that the deflection of the rear wheels is always smaller than that of the front wheels. In principle however it is always possible to store the measuring times of the RSSI data points as well and extend the method correspondingly to steered rear wheels. On the other hand there are two possible reasons for a wheel not to be deflected. One is based on the method disclosed to date: the undeflected wheel is an unsteered wheel. It may however simply be that the vehicle only moved in a straight line when traveling up to that point.

In order to exclude the second error, a counter 36 can be provided, which is also connected to the computation unit 31 and which determines the length of the start-up phase at the start of travel. In the simplest instance the counter 36 is a clock but it can also count how many different deflection angles ω the deflection detector 35 has identified during the current journey. Position determination is uncertain before the expiry of a specified period or before a specific number of deflection angles ω has been achieved.

The user can be shown this in different ways on a display 37: no information is displayed about the physical variable or the information is displayed that the data is not yet available or the information about the physical variable and the position determination is evaluated and displayed but color for example is used to indicate that it is uncertain. Of course the expiry of a fixed period is only an index and does not ensure a reliable position determination.

Once the method has been used on the one hand to determine the front/rear position and on the other hand to determine the right/left position of each wheel, the precise position of the wheel 10 is defined. From this point on the identification code of each transmitter is sufficient for a unique position determination. This assignment between the transmitter and position can be stored in a position memory 38 temporarily or even semi-permanently (e.g. flash). Position determination can be carried out from this storage point on solely or additionally by simply reading the assignment.

This assignment is reliable until the mounting positions of the wheels 10 or the wheels 10 themselves change, for example as a result of a wheel change. It is therefore possible to provide a calibration phase, during which a position determination takes place based on the method according to the invention, after which reliable assignment data is available in the position memory 38. The calibration phase can be carried out in the factory or can be initiated by the user, by giving the evaluation/storage unit 30 a corresponding command via a non-illustrated input device. The calibration phase is started automatically when the vehicle has been parked for longer than a predefined period, e.g. 15 minutes (in particular with the engine off or ignition off). The reason for this is that the driver may have changed the wheel during this time and this should be automatically detected or recalibrated.

Finally it should be pointed out that although the invention was primarily described in relation to a four-wheeled automobile, the method can be applied without significant modification to motorbikes or three-wheeled vehicles. For all these vehicles the same distinction is made between steered and unsteered wheels, which corresponds almost always to the assignment to front and rear wheels.

This application claims the priority, under 35 U.S.C. § 119, of German patent application No. 10 2004 006 977.8, filed Feb. 12, 2004; the entire disclosure of the prior application is herewith incorporated by reference.

I claim:

1. A method for monitoring a physical variable of a wheel fitted on a vehicle during travel, which comprises the steps of:
    measuring the physical variable at the wheel;
    transmitting a radio message containing information about the physical variable;
    receiving and processing the radio message on the vehicle;
    determining and storing a first comparative intensity distribution of a receiving strength of radio signals at predefined deflection angles between a longitudinal axis of the vehicle and a plane of the wheel;
    recording a random sample of an actual intensity distribution of the receiving strength of further radio signals during operation by repeated transmission and receiving of a plurality of the further radio messages;
    using a statistical test to determine whether the random sample could have been taken from the first comparative intensity distribution and a test result being used to decide whether or not the wheel has achieved a predefined deflection angle; and
    concluding from the predefined deflection angle determined by the statistical test, whether the wheel is a steered wheel or an unsteered wheel.

2. The method according to claim 1, which further comprises calculating and comparing statistical test moments of the random sample with corresponding moments of the first comparative intensity distribution.

3. The method according to claim 1, which further comprises recording at least a second comparative intensity distribution beforehand at a second deflection angle, which is different from the predefined deflection angles for the first comparative intensity distribution.

4. The method according to claim 3, which further comprises setting the second deflection angle to be a zero position, in which the plane of the wheel and the longitudinal axis of the vehicle are parallel to each other.

5. The method according to claim 1, which further comprises:
    determining an actual deflection angle of the steered wheels of the vehicle independently;
    storing the actual deflection angle for every data point of the random sample;
    using the actual deflection angle to create sub-groups of the random sample with essentially similar deflection angles to each other; and
    testing the sub-groups in each instance against the first comparative intensity distribution, which was defined for a given deflection angle that corresponds as closely as possible to the actual deflection angle.

6. The method according to claim 5, which further comprises rejecting the sub-groups, if the actual deflection angle differs beyond a defined degree from the given deflection angle, for which the first comparative intensity distribution was defined.

7. The method according to claim 1, which further comprises transmitting acceleration, speed and/or tire profile depth information measured at the wheel.

8. The method according to claim 1, which further comprises:
    transmitting from each of the wheels of the vehicle, a radio message containing identification information that is characteristic of the wheel and in which the wheels can be categorized as steered or unsteered wheels and also as wheels disposed on the right and left in relation to the longitudinal axis of the vehicle, the wheels are advantageously classified with reference to the radio messages by the further steps of:
    deciding by the statistical test of the random sample against the first comparative intensity distribution whether the wheel is a steered wheel or an unsteered wheel;
    having the radio messages received at a location not on the longitudinal axis of the vehicle;
    using a comparison of the received signal strengths to determine a distance from a receiving location; and
    deciding whether the wheel is disposed on the right or left of the longitudinal axis of the vehicle.

9. The method according to claim 8, which further comprises:
performing a calibration phase when the vehicle is stationary for determining positions of the wheels; and
assigning the identification information for every one of the wheels to a determined associated position after completion of the calibration phase and storing the determined associated position.

10. The method according to claim 1, which further comprises:
performing a start-up phase when the vehicle is traveling; and
terminating the start-up phase when a minimum travel time has elapsed or a minimum number of deflection angles has been achieved and there being a possibility of classifying position information as inaccurate or not possible to determine within the start-up phase.

11. The method according to claim 10, which further comprises displaying information regarding the start-up phase and/or an end of the start-up phase to the user.

12. The method according to claim 2, which further comprises calculating the standard deviation of the random sample as the statistical test moments.

13. The method according to claim 1, which further comprises measuring tire pressure as the physical variable.

14. A system for monitoring a physical variable of a wheel fitted on a vehicle, during travel, the system comprising:
a sensor;
a transmitter disposed on the wheel for transmitting a radio message;
a receiver with an intensity detector communicating with said transmitter, said receiver determining a signal strength of a received radio message; and
an evaluation/storage unit connected to said receiver, said evaluation/storage unit having:
a distribution memory for storing at least one intensity distribution;
an intensity memory for storing measured intensity values;
a computation unit connected to said distribution memory and said intensity memory, said computation unit configured for data transfer and standard statistical methods; and
a comparison device connected to and operating together with said computation unit, said comparison device configured for verifying whether a random sample corresponds to a given distribution function and for determining from the verification step whether the wheel has achieved a predefined deflection angle, it being possible to derive from the predefined deflection angle determined by the verification step whether the wheel is a steered wheel or an unsteered wheel.

15. The system according to claim 14, wherein said computation unit has an integrator for statistical moments and said comparison device is configured to decide whether or not a given value is within a tolerance interval.

16. The system according to claim 14, further comprising a deflection detector mounted on the wheel, a wheel case or a steering system, said deflection detector connected to said computation unit.

17. The system according to claim 14, wherein said sensor is selected from the group consisting of acceleration sensors for measuring acceleration, speed sensors for measuring speed and tire profile sensors for measuring a tire profile depth, said sensor connected to said transmitter to transmit data in the radio message.

18. The system according to claim 14, wherein each wheel of the vehicle has one said transmitter and an identification memory for permanent storage of identification information that is characteristic of the wheel, and said receiver has a receiving antenna not attached on a longitudinal axis of the vehicle, said evaluation/storage unit connected to said receiver assigning received radio messages to each said transmitter based on the identification information and a right/left assignment of said transmitter associated with the radio message being made on a basis of the intensity of the received radio message.

19. The system according to claim 18, wherein said evaluation/storage unit has a position memory connected to said computation unit, said position memory stores the assignment of the identification information to positions of the wheels.

20. The system according to claim 14, further comprising a clock for measuring a duration and expiry of a start-up phase implemented when the vehicle is traveling, an expiry signal being emitted to said evaluation/storage unit after expiry of the start-up phase.

21. The system according to claim 14, further comprising a counter for counting different deflection angles, said counter counting a duration and expiry of a start-up phase implemented when the vehicle is traveling based on a minimum number and duration of deflection angles occurring, an expiry signal being emitted to said evaluation/storage unit after expiry of the start-up phase.

22. The system according to claim 20, further comprising a display coupled to said evaluation/storage unit, said display displaying the duration or expiry of the start-up phase.

23. The system according to claim 21, further comprising a display coupled to said evaluation/storage unit, said display displaying the duration or expiry of the start-up phase.

24. The system according to claim 14, wherein the physical variable measured is tire pressure.

* * * * *